United States Patent [19]
Lenahan et al.

[11] Patent Number: 5,224,822
[45] Date of Patent: Jul. 6, 1993

[54] INTEGRAL TURBINE NOZZLE SUPPORT AND DISCOURAGER SEAL

[75] Inventors: Dean T. Lenahan, Cincinnati; Charles F. Riedmiller, Loveland, both of Ohio; Andrew P. Elovic, Rishon Lezion, Israel

[73] Assignee: General Electric Company, Cincinnati, Ohio

[21] Appl. No.: 699,061

[22] Filed: May 13, 1991

[51] Int. Cl.$^5$ ............................................. F03B 1/04
[52] U.S. Cl. ........................... 415/189; 415/177; 415/190; 415/209.3
[58] Field of Search ............... 415/188, 189, 190, 191, 415/209.2, 209.3, 209.4, 208.2, 210.1, 177

[56] References Cited
U.S. PATENT DOCUMENTS

| | | | |
|---|---|---|---|
| 4,297,222 | 7/1981 | Barbeau | 415/177 |
| 4,310,574 | 1/1982 | Deadmore et al. | 427/405 |
| 4,374,183 | 2/1983 | Deadmore et al. | 428/641 |
| 4,396,349 | 8/1983 | Hueber | 415/115 |
| 4,522,559 | 6/1985 | Burger et al. | 415/196 |
| 4,527,385 | 7/1985 | Jumelle et al. | 60/39.07 |
| 4,551,064 | 11/1985 | Pask | 415/116 |
| 4,768,924 | 9/1988 | Carrier et al. | 415/189 |
| 4,815,933 | 3/1989 | Hansel et al. | 415/189 |
| 4,826,397 | 5/1989 | Shook et al. | 415/116 |
| 4,883,405 | 11/1989 | Walker | 415/189 |
| 4,916,906 | 4/1990 | Vogt | 60/757 |

Primary Examiner—Edward K. Look
Assistant Examiner—Mark Sgantzos
Attorney, Agent, or Firm—David L. Narciso; Jerome C. Squillaro

[57] ABSTRACT

The invention comprises the use of a thermal barrier coating on a member of a gas turbine engine component with one surface of the member exposed to high temperature but not exposed to high velocity gases, as an insulating material to slow the heat transfer to the substrate of the component member and allow thermal gradients within acceptable material limits between the thermal barrier coated member and the remainder of the component. In a particular application, the use of a thermal barrier coating enables making a high pressure turbine nozzle integral with a discourager seal lip, eliminating fasteners protruding into the rotor/stator cavity and split lines between segments of the prior art that allowed high temperature gas ingestion further into the cavity and caused windage losses.

7 Claims, 5 Drawing Sheets

INTEGRAL TURBINE NOZZLE SUPPORT AND DISCOURAGER SEAL

The government has rights in this invention pursuant to Contract No. F33657-83-C-0281 awarded by the Department of the Air Force.

FIELD OF THE INVENTION

This invention relates generally to gas turbine engines and, more particularly, to structure for limiting hot gas ingestion into a rotor/stator cavity. Although the invention can be advantageously used to provide an unsegmented seal in the rotor/stator cavity at the high pressure nozzle/rotor blade interface, it can be used in other areas where segmentation is undesirable but necessary to avoid problems resulting from thermal gradients during transient operations.

BACKGROUND OF THE INVENTION

High performance gas turbine engines include as depicted schematically in FIG. 1, along longitudinal axis 101 a compressor 4, a combustor 6, a high pressure turbine nozzle 10, and a high pressure turbine 50. Core air is compressed by the compressor and discharged in axial flow as high pressure air to the combustor where fuel is injected and ignited. The hot, pressurized gases, which in modern engines can be in the range of 2,000° F., are allowed to expand through the high pressure turbine nozzle which directs the flow to turn the turbine, which is coupled by a rotor shaft 51 to drive the compressor. The core gases then exit the high pressure turbine providing energy downstream in the form of additional rotational energy extracted by additional and lower pressure turbine stages and/or thrust through an exhaust nozzle.

A portion of high pressure air can be bled from the compressor and used as high pressure cooling air to cool downstream apparatus, such as the combustor, nozzle, and turbine, and high pressure cavity purge air, but such high pressure cooling and cavity purge air consumes work from the turbine and is quite costly in terms of engine performance. Reducing the cooling and cavity purge air requirement allows a higher core air flow, reduces the energy expended by the turbine and increases the energy available in the gas flow path.

In addition to using high pressure cooling air to protect the combustor and subsequent components from the effects of high temperature gases, such as high gas velocity oxidation and thermal fatigue, gas turbine engines can also employ protective coatings such as Thermal Barrier Coatings (TBC) to protect engine parts. Typically a TBC when applied to a metal substrate, protects the substrate from the effects of exposure to high temperature gases and acts as an insulating layer between the hot flowpath gases and the substrate. A thermal barrier coating system typically has multiple layers. Typically, such a system has at least a bond coat layer such as MCrAlY and a top coat such as a ceramic, like Yttria-stabilized zirconia layer, and may include additional layers.

A high pressure turbine nozzle, such as described in *Aircraft Gas Turbine Engine Technology*, 2d edition, (McGraw-Hill, 1979), pages 480–481 and incorporated herein by reference, typically comprises circumferentially adjacent paired vane segments, each vane extending radially outward from an inner to an outer band. The nozzle defines an annular core gas flowpath, turning the core flow to an angle for optimum performance of the turbine. The nozzle is segmented into the paired vanes to limit problems from differing thermal responses between the nozzle and supporting structure, creating gaps to allow for thermal growth of the segments. The nozzle uses high pressure cooling air for convection, impingement, and film cooling. Spline seals are placed in slots formed in the segments inner and outer bands circumferentially abutting surfaces to prevent leakage of hot core gases and uncontrolled loss of high pressure coolant air flow through these gaps.

The nozzle is positioned by seating the inner and outer bands of each nozzle segment in inner and outer support members, which transfer the pressure loads experienced by the nozzle to the engine casings and frame through the cold structures. The outer support member is not part of this invention. The inner band is typically mounted and retained to the inner nozzle support by means of bolts, pins or a combination of both at the inner band aft flange.

A gap exists at the interface between the high pressure nozzle inner band and turbine rotor blades. Any hot core gas leaking across this interface exits the working gas stream with a resultant loss of energy available from the gas turbine engine. Additionally, the turbine and nozzle structural members need to be protected from these hot core gases. To limit hot gas ingestion into this gap and to shield the inner nozzle support from high temperature gases, circumferential discourager seals are located in series, radially, typically including a nozzle inner band overhang, a high pressure turbine blade angel wing, and discourager seal(s) bolted to the nozzle support. Each discourager seal typically consists of circumferentially segmented members, creating split lines that permit leakage. A series of discourager seals create an air flow circuit with cavities in flow communication with each other. High pressure air that originated as high pressure cooling air can be vented to the rotor/stator interface, and used to purge these cavities of hot gases, the turbine acting to pump the air radially outward. Such cavity purge air is a loss chargeable to the performance of the gas turbine engine and therefore the requirement for this flow should be minimized.

As the temperature of the cavity otherwise exposed to the inner nozzle support often exceeds the material capability of the support, discourager seals bolted to the support are typically thin, sheet metal seals that also act to insulate the support. Due to high thermal gradients, the seals are segmented to cut tangential stress, and are not integral with the support, which is typically not segmented, due to the differing thermal environment and thermal response characteristics. Additionally, many engines include a separate stationary seal between the rotor and the nozzle support which is also typically bolted in position.

Because the turbine rotates at high speeds while the nozzle assembly remains stationary, any structural protrusion into the rotor/stator cavity causes "windage losses." Such losses include the direct mechanical effect of work required to accelerate air to the speed of the rotor, which induces a drag effect on the rotor, and also the indirect effect of the resultant temperature rise in the purge air. High temperature air in the cavity needs to be avoided, thus requiring a higher purge flow. Every discontinuity in the flowpath environment causes windage losses, as the air is slowed and then must be reaccelerated. Segmentation of the discourager seal has been found to cause such losses, as does each bolthead or other threaded fastener exposed to the rotor/stator cavity.

One prior solution was to replace bolts with recessed Torx head screws and to protect the bolt heads with windage covers. However, because of the hostile temperature environment in this area, bolts and screws frequently become seized making disassembly without damage difficult. The parts count and complexity of assembly also made this solution unattractive.

Bolts or other fasteners which protrude into the rotor/stator cavity also affects how long the nozzle inner band overhang needs to be. The overhang is a hard area to cool and shortening the overhang would reduce the requirement for high pressure cooling air.

In addition to the above performance related problems encountered in using a segmented discourager seal and threaded fasteners to assemble the high pressure turbine nozzle, maintainability requirements for hot section structures such as the high pressure turbine nozzle that require periodic inspection and replacement necessitate an improved mounting arrangement that reduces the complexity and number of parts involved in assembly and disassembly.

SUMMARY OF THE INVENTION

It is therefore among the objectives of this invention to provide a design which reduces the requirement for high pressure air in the rotor/stator cavity by eliminating segmentation of the discourager seal and reducing the effect of fasteners protruding into the cavity. It is also an objective of this invention to provide a design which reduces complexity and parts count and combines the retention features of the nozzle and stationary seal, while avoiding the problem of bolt seizure.

These and other objectives are accomplished by a nozzle support structure in which the high pressure turbine nozzle support is integrated with the discourager seal to provide one integrated, circumferentially continuous piece with no split lines. TBC is applied to the circumferentially outer surface of the seal, insulating the support from the high temperature cavity during steady state operation, and slowing the heat flux into the seal portion during transient operation.

An integral nozzle support and seal structure in accordance with the present invention achieves weight and cost reductions by avoiding a separate discourager seal, eliminating fastener means with respect to connecting the discourager seal to the support structure, significantly decreasing the parts count and complexity of nozzle assembly, and improving maintainability. An integral nozzle support and discourager seal formed as one continuous 360 degree ring eliminates the split lines, reducing hot gas ingestion and reducing windage losses significantly. In addition, when the present invention is used in conjunction with a Boltless Turbine Nozzle/Stationary Seal Mounting apparatus, as taught in a copending application S/N 07/699,060 filed concurrently herewith and incorporated by reference herein, the axial length necessary for installation of the retaining means is shortened and the inner band overhang length may be shortened, further reducing high pressure cooling air requirements.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
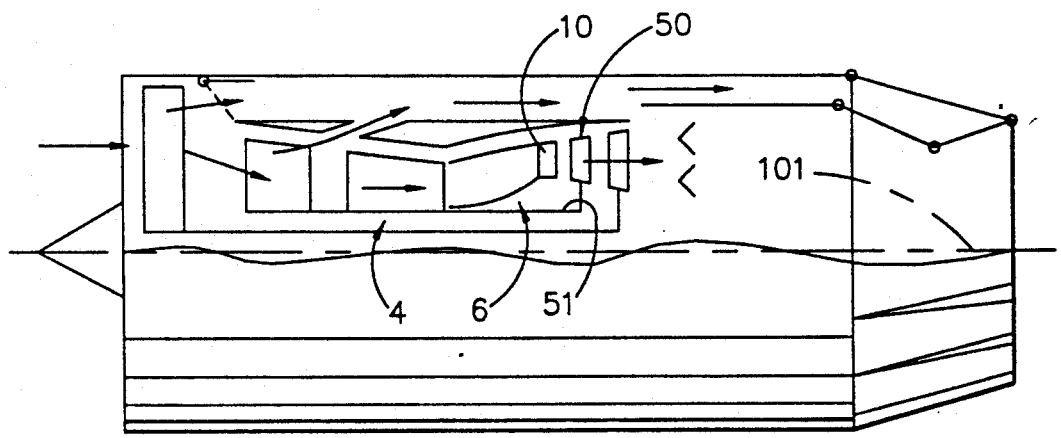
FIG. 1 is a schematic representation of a gas turbine engine.

A high performance gas turbine engine is schematically illustrated in FIG. 1, including a compressor 4, a combustor 6, a high pressure turbine nozzle 10, and a high pressure turbine 50.

Figure 2:
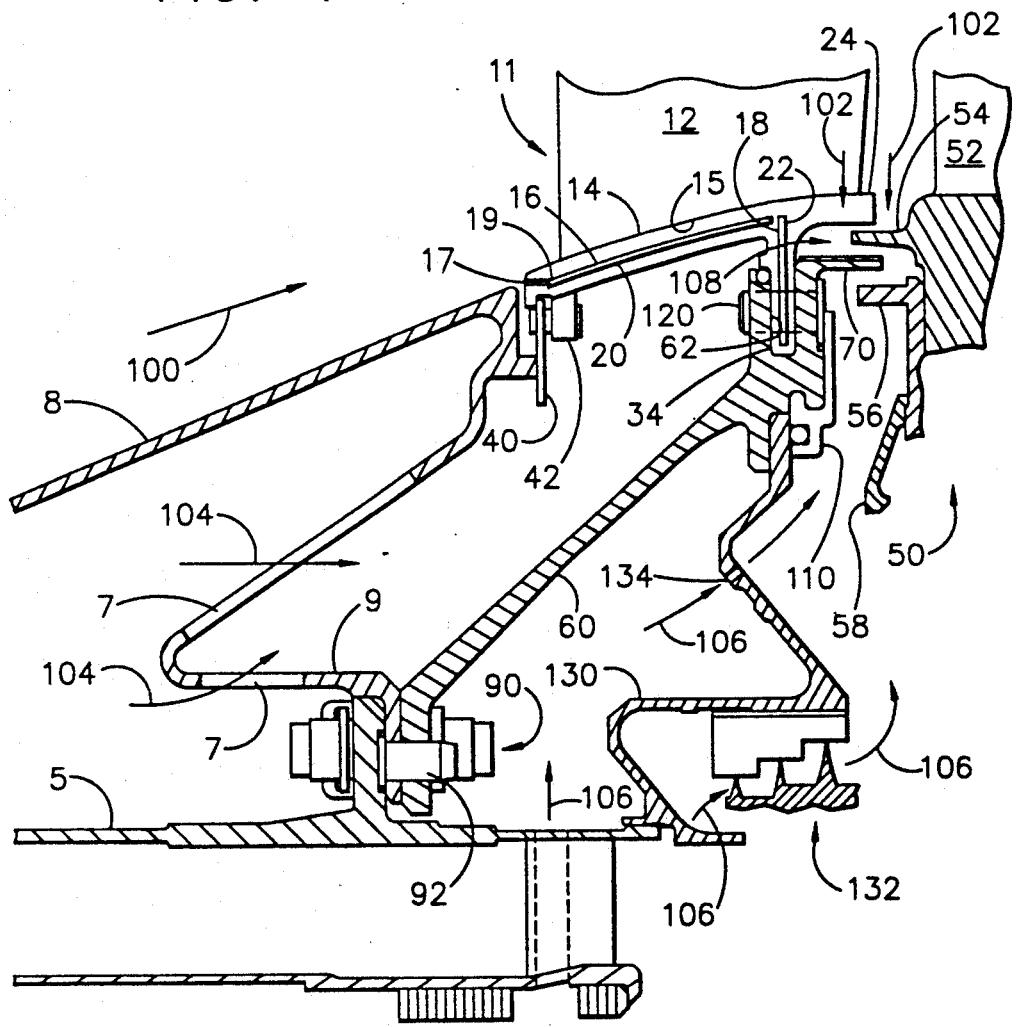
FIG. 2 is an elevational view in partial cross section of a high pressure turbine nozzle mounting arrangement which embodies the principles of this invention.

Referring now to FIG. 2, a cross section of a high pressure turbine nozzle mounting arrangement is shown in relation to adjacent sections of the engine. A nozzle segment 11 is mounted in the inner nozzle support 60 forward of the high pressure turbine 50. Nozzle segment 11 includes a high pressure turbine nozzle vane 12 joined to a nozzle inner band 14 with nozzle inner band aft flange 34 mounted in mounting slot 62 of inner nozzle support 60. Split retaining ring 110 holds pin 120 and stationary seal 130 in position. The inner nozzle support 60 has an aft extending discourager seal lip 70 and is attached to the combustor inner support 9 and cold structure 5 by a bolt 90 after being aligned by alignment pin 92.

Nozzle inner band 14 includes a nozzle inner band overhang 24 and slots 16 and 18 for retaining inner band axial and radial spline seals 20 and 22 respectively. Slot entrance 17 is narrower than slot 16 and can be used for insertion of spline seals 20 between nozzle segments 11. Once the seal is inserted past elbow 19, it will not back out of the entrance. Seal 40 is attached to mounting means 42 to prevent ingestion of hot core gases 100 and escape of high pressure cooling air flow 104.

A portion of a high pressure turbine blade 52 is shown with a high pressure turbine blade angel wing 54 shown extending forward into the buffer cavity 108 between the nozzle inner band overhang 24 and the discourager seal lip 70. A portion of a high pressure turbine blade retainer arm 58 is shown holding a high pressure turbine blade damper arm 56 which serves as another discourager seal against the high pressure turbine blade 52.

The combustor liner 8 and nozzle inner band flowpath surface 15 contain the hot core gas flow 100. There is some hot gas ingestion 102 between the circumferential nozzle segments at the nozzle inner band overhang 24 and through the gap between the overhang 24 and turbine blade 52. High pressure cooling air flows through openings 7 in the combustor inner support and into nozzle segments 11. High pressure cavity purge air 106 flow bleeds through hole 134 in stationary seal 130, mixing with high pressure cavity purge air that leaks through labyrinth seal 132.

Figure 3:
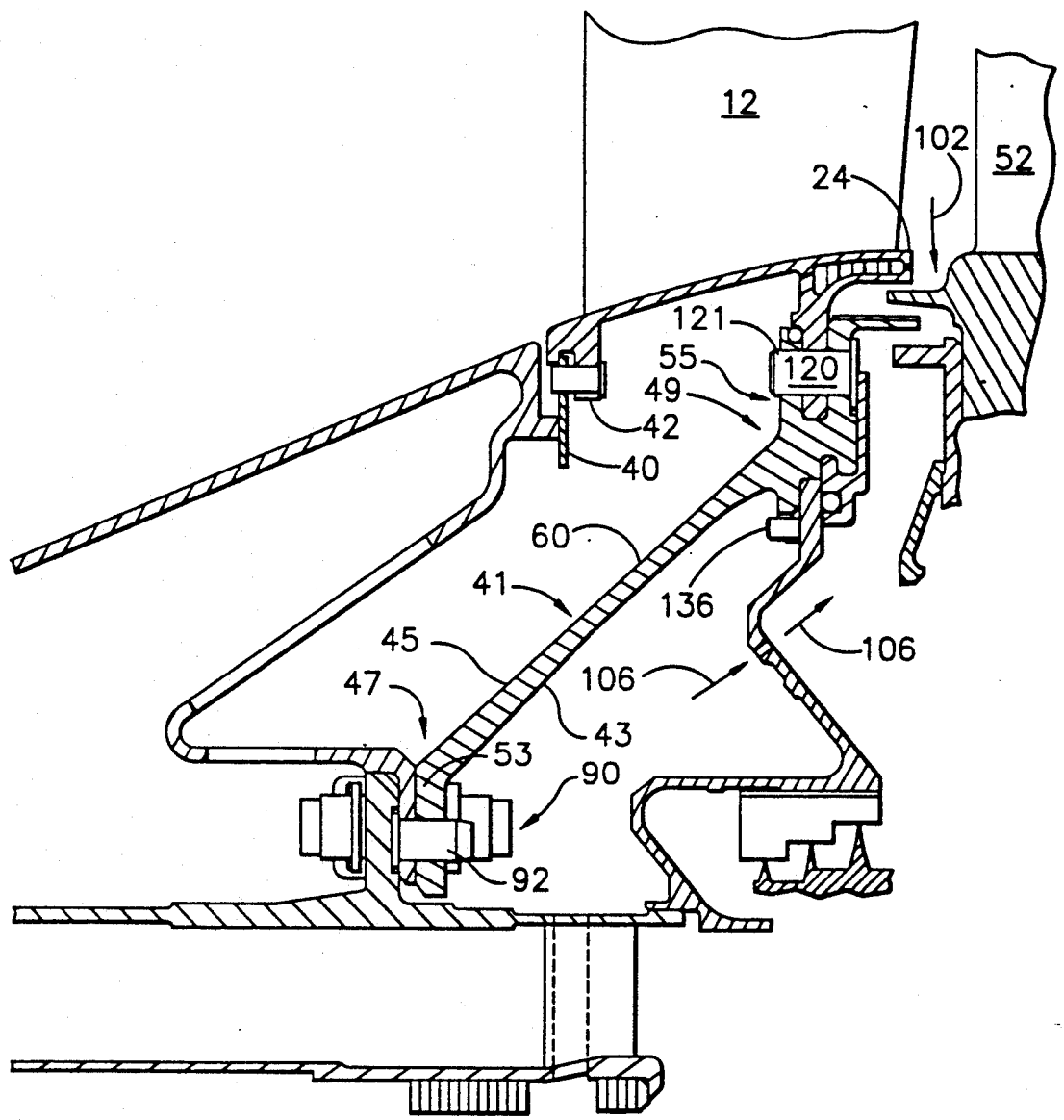
FIG. 3 is a second elevational view in partial cross section of the high pressure turbine nozzle mounting arrangement of FIG. 2 at a different angular location.
Figure 4:
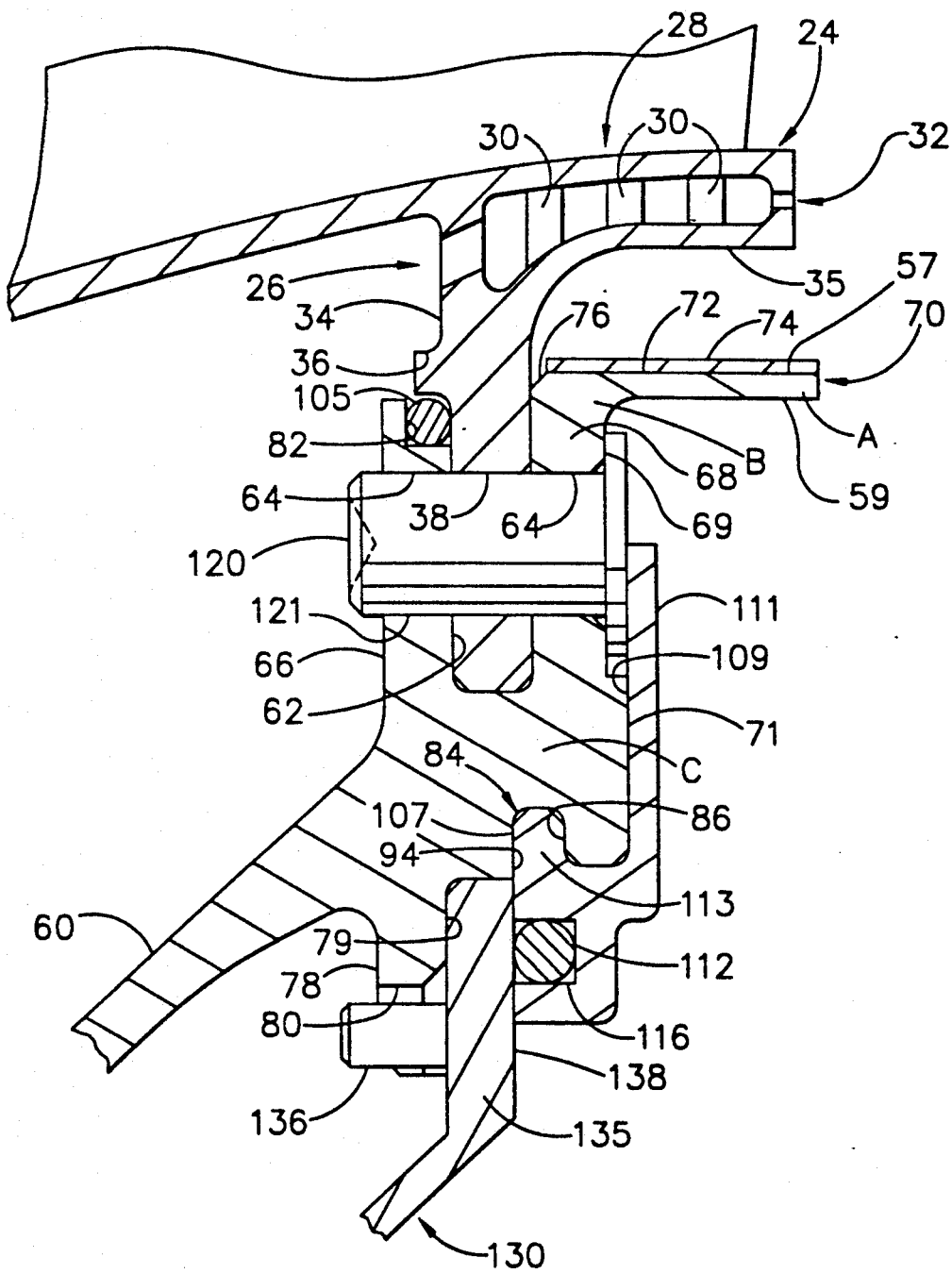
FIG. 4 is an enlarged view of a portion of FIG. 3, minus the turbine blade.

Referring to FIG. 3 and 4, an enlarged cross-sectional view shows the nozzle inner band overhang cooling circuit and a more detailed depiction of the discourager seal and nozzle support assembly.

Inner nozzle support 60 includes a generally conical section 41 with an inner surface 43 and an outer surface 45. The circumference of the conical section 41 surfaces 43, 45 radially increase from a longitudinal first, forward end 47 to a second, aft, end 49. A first flange 53 extends circumferentially and radially inward from the conical section first end 47 and includes means for mounting the support 60 to the engine structure 5, including the holes for bolt 90 and alignment pin 92. A second flange 55 extends circumferentially and radially outward from the conical section second end 49 to an outer circumference. The second flange 55 includes seal segment mounting means including a U-shaped circumferential groove 62 facing radially outward which serves as a mounting slot for receiving a turbine nozzle segment mounting flange 34. Groove 62 is defined between a first, forward, wall 66 and a second, aft, wall 68.

Nozzle inner band overhang 24 includes high pressure cooling air entry port 26 leading to pin bank 28 wherein pins 30 conduct heat from the overhang 24 outer surfaces and are in turn cooled by convection, the cooling air exiting through trailing edge holes 32. Inner surface 35 of overhang 24 faces discourager lip seal 70. Nozzle inner band aft flange 34 has shoulder 36 that cooperates with groove 82 in support 60 to engage seal wire 105. Each nozzle segment inner band aft flange 34 includes holes 38 for mounting pins 120. Annular discourager seal lip 70 with chamfer 76 extends aft from inner nozzle support 60 second flange 55, comprising an outer annular surface 57 extending aft from the second flange radially outer circumference, and an inner annular surface 59. Annular discourager seal lip 70 further comprises substrate 72 of the same material as support 60 with a thermal barrier coating 74 applied on the outer annular surface 57.

Second flange 55 includes holes 64 through first wall 66 and second wall 68 for pin 120, which is engaged by outer circumferentially planar face 69 of support 60 and flange 111 of split retaining ring 110. Radially inward extending third flange 78 has outer surface 79 which cooperates with split retaining ring 110 to engage flange 135 of stationary seal 130. Third flange 78 has four circumferentially located slots 80 which engage stationary seal antirotation tabs 136 to prevent seal 130 from rotating during engine operation.

Split retaining ring 110 retains the assembly by having surface 109 of flange 111 engage the flat outer surface 124 of the head 122 of pin 120 and the inner circumferentially planar face 71 of support 60, with a second surface 107 of ring 110 engaging stationary seal flange 135 circumferentially planar surface 138 and circumferentially planar surface 94 extending radially inward from circumferential, radially inward facing groove 86. Hook section 113 of ring 110 engages circumferential groove 86 formed in support 60 by hook section 84 of support 60. A shear wire 112 inserted in groove 116 cut in surface 107 also engages seal surface 138.

Figure 7:
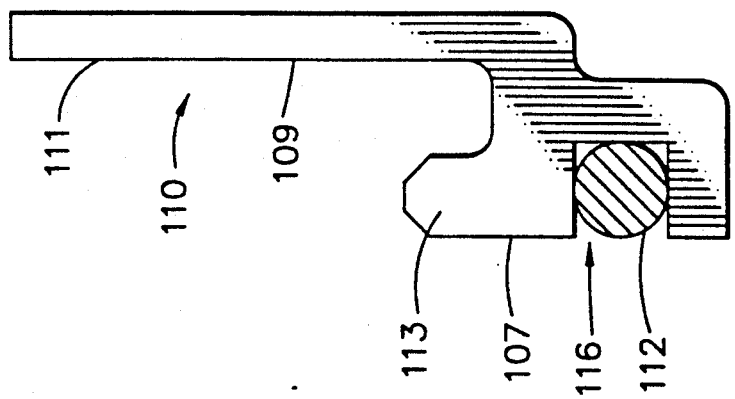
FIG. 7 is an enlarged cross sectional view of the split retention ring of FIG. 5.
Figure 5:
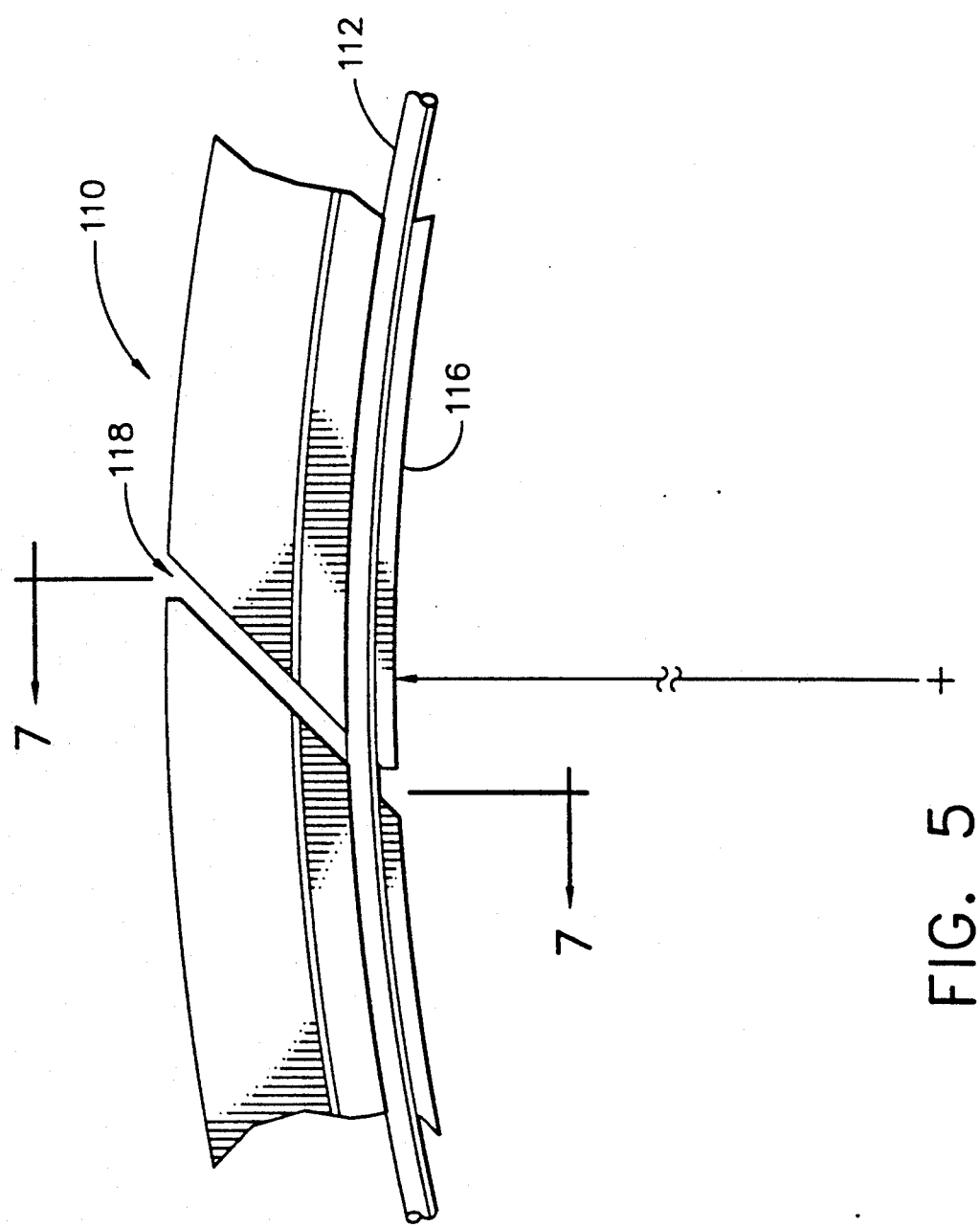
FIG. 5 is a partial elevational view of the split ring retention means used in the high pressure turbine nozzle mounting arrangement of FIG. 2.
Figure 6:
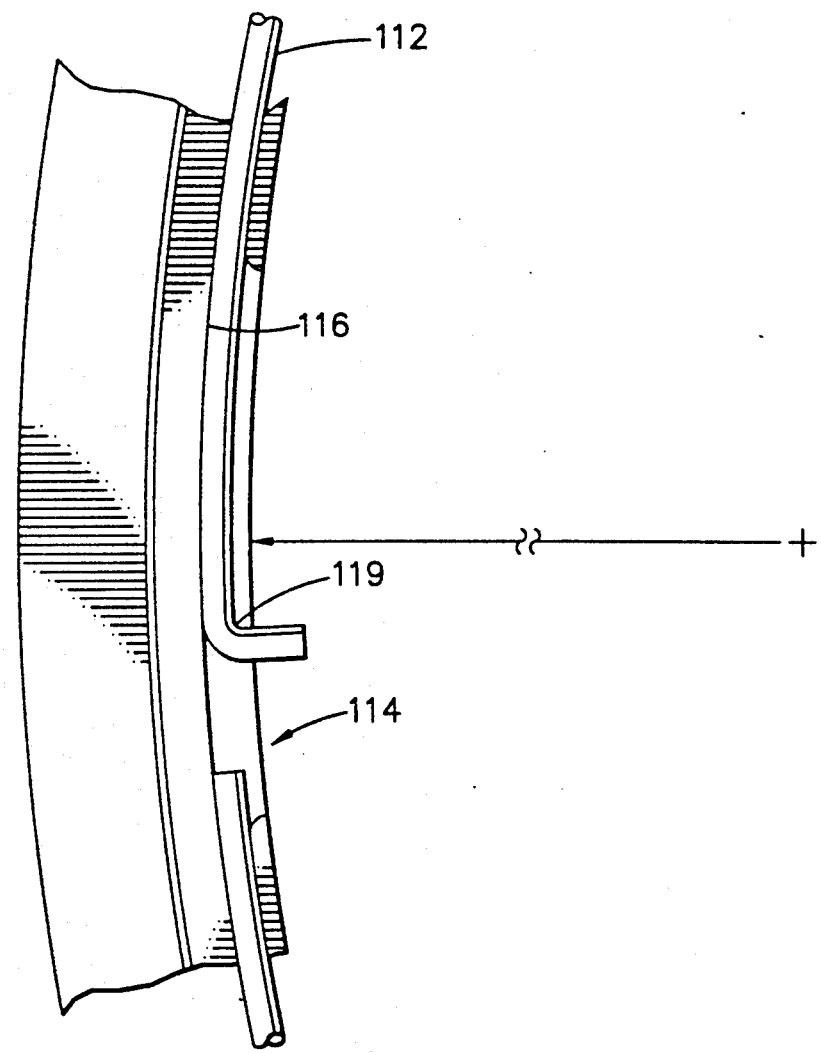
FIG. 6 is a second partial elevational view of the split retention ring at a position 90 offset from FIG. 5.

FIG. 5 is an forward looking aft view of the section of the split retaining ring 110 including split 118. Groove 116 retains shear wire 112 which bridges split 118. FIG. 6 is a view 90° offset from FIG. 5 showing slot 114 for insertion of shear wire 112 into groove 116, with bend 119 in shear wire to prevents circumferential motion after installation. FIG. 7 is a side elevation view cut across plane 7-7 of FIG. 5, showing flange 111, shear wire 112 located in groove 116, and chamferred hook section 113.

Figure 8:
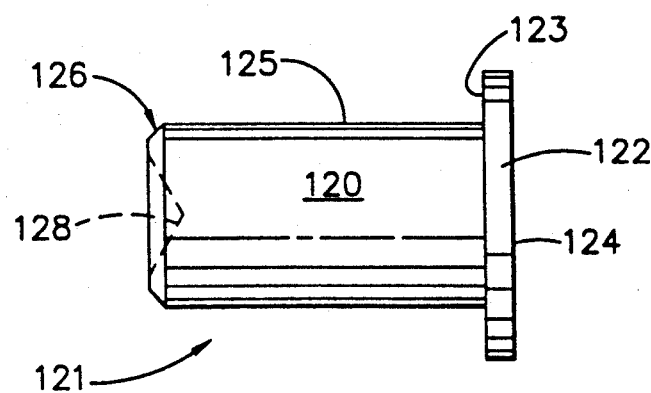
FIG. 8 is an elevational view of the attachment pin used in the high pressure turbine nozzle mounting arrangement of FIG. 2.

FIG. 8 is an elevational view of attachment pin 120 showing head 122, flat inner surface 123 which contacts support 60, flat outer surface 124 which engages ring, and cylindrical surface 125 which contacts surfaces defining holes 38 and 64. Chamfer 126 facilitates insertion in holes 38 and 64, and dimple 128 lessens the potential for tools damaging other parts if it is necessary to tap pin 120 in order to remove it.

In a preferred embodiment, the high pressure turbine nozzle 10 comprises a number of circumferentially adjacent paired nozzle vane segments 11, defining an annular hot core flow path, mounted on inner nozzle support 60 which is in turn connected to engine structural support members at bolts 90 throughout the circumference of the inner nozzle support 60. A number of alignment pins 92 serve to locate the support and thus the nozzle in relation to other sections of the engine. The relationship of the members comprising the nozzle support assembly is as depicted in the drawings and described above and in co-pending application (13DV-10723), Boltless Turbine Nozzle/Stationary Seal Mounting apparatus.

In a preferred embodiment, the nozzle discourager seal is made integrally with the inner nozzle support. The seal has a thinner cross section than the remainder of the support, and thus subject to quicker thermal response. In a high performance gas turbine engine, especially in a military aircraft environment, the engine is subject to numerous throttle bursts and chops, referred to as transient operations, creating changes in temperature of the hot core gases and in supply of high pressure cooling and cavity purge air. Absent a thermal barrier coating, if the discourager seal lip was made as depicted in this application, the faster thermal response of the seal lip would cause stresses in the support section connecting the support structure to the seal lip, as the seal lip would seek to expand or contract much faster than the greater thermal mass of the support, ultimately inducing failure of the support. In order to avoid such failure, the prior art taught the use of segmented discourager seal separate from the support.

Application of a thermal barrier coating, normally used to protect surfaces exposed to high temperature, high velocity gas flow, to the outer annular surface of the discourager seal lip, in a non-flowpath environment, was found to insulate the support 60 from the high temperature of buffer cavity 108, but more importantly it was discovered that thermal barrier coating, slowed the thermal response of the discourager seal to more closely match the thermal response of the support, avoiding the induced stresses from the rapid changes in temperature accompanying transient operations. During an acceleration condition, the flow of high pressure cooling air and cavity purge air increases as well as the temperature of the ingested gases 102. The inner lip surface is thus cooled while the thermal barrier coating inhibits the heat transfer from the buffer cavity which has increased in temperature. The temperature of the support as a whole tends to rise uniformly, effectively reducing the metal thermal gradients between points A and B or points A and C shown on FIG. 4. During a deceleration mode, coolant air is reduced as well as the temperature of the ingested hot gases, and again the thermal barrier coating enables the discourager seal to cool down at close to the same rate as the main part of the support.

By using the thermal barrier coating, the inner nozzle support may be made integrally with the discourager seal by adding a lip to the outer circumference. Thermal barrier coating in a preferred embodiment is air plasma sprayed on the seal lip and then lathed back to an appropriate thickness. This simplifies manufacturing and as the seal is integral with the support, there are weight, cost, and assembly savings. Particularly important to the performance of the engine, split lines between seal segments are entirely eliminated, entirely eliminating this path for hot gas ingestion, making the discourager seal much more efficient. Further, by eliminating fasteners from the rotor/stator interface, the length of the inner nozzle band overhang can be reduced, in turn reducing the requirement for cooling air.

While the invention has been described in what is presently considered to be a preferred embodiment, other variations and modifications will become apparent to those skilled in the art. It is intended, therefore, that the invention not be limited to the illustrative embodiment but be interpreted within the full spirit and scope of the appended claims.

What is claimed is:

1. In a gas turbine engine including a member comprising a metallic substrate having a first section exposed to one thermal environment and a second section with a surface exposed to a different thermal environment, but not subject to high velocity gases, use of a thermal barrier coating on the metallic substrate limited to said surface of said second section in order to cause said second section substrate thermal response to closely correspond to said first section.

2. The gas turbine engine member of claim 1 wherein said member first section is circumferentially continuous with a surface exposed to cooling air, and wherein said second section is a circumferentially continuous seal portion with said surface exposed to a different thermal environment being a surface exposed to high temperature gases.

3. The gas turbine engine member of claim 2 wherein said first section is a high pressure turbine nozzle support, and wherein said second section is a discourager seal.

4. A turbine nozzle and nozzle support assembly for a gas turbine engine comprising:
   a turbine nozzle segment with a mounting flange extending radially inwardly, said mounting flange including a hole for receiving a mounting pin;
   an inner nozzle support comprising:
     a generally conical section having a longitudinal axis with an inner surface and an outer surface, the circumference of said surfaces radially increasing longitudinally from a first, forward, end to a second, aft, end;
     a first flange extending circumferentially and radially inward from said conical section first end and including means for mounting said support to an engine structure;
     a second flange extending circumferentially and radially outward to an outer circumference from said conical section second end, said second flange including seal segment mounting means comprising a U-shaped circumferential groove facing radially outward for receiving said turbine nozzle segment mounting flange and at least one longitudinally extending hole for receiving said mounting pin to engage said nozzle mounting flange within said U-shaped circumferential groove;
   a longitudinally extending, metallic, annular discourager seal with an inner annular surface and an outer annular surface extending aft from said second flange radially outer circumference, said discourager seal comprising the same material as the second flange and acting as a substrate to a thermal barrier coating applied to said outer annular surface of said discourager seal and not applied to said inner annular surface;
   wherein during engine operation said generally conical section has a surface exposed to cooling air and wherein the radially outer annular surface of said discourager seal is exposed to high temperature gases in a buffer cavity, and wherein during transient operation said thermal barrier coating acts to slow the thermal flux to the substrate seal material to cause the thermal response of said longitudinally extending annular discourager seal to more closely correspond to the thermal response of said generally conical section.

5. The inner nozzle support of claim 4 wherein during transient engine operation the thermal barrier coating acting to slow the thermal flux to the substrate seal material maintains the thermal gradients between the seal substrate and the second flange so as to prevent the seal lip from expanding or contracting at a rate that would induce failure of said support.

6. A high pressure turbine nozzle support for a gas turbine engine comprising:
   a support section to be exposed to a first thermal environment;
   said support section integral with a discourager seal section to be exposed to a second thermal environment removed from the hot core flow path;
   said support section and said discourager seal section forming one circumferentially continuous support with no axially extending splits in the discourager seal surface;
   wherein said discourager seal section includes a radially outer surface comprising a thermal barrier coating over a metallic substrate and a radially inner surface not including a thermal barrier coating;
   wherein the discourager seal substrate comprises the same material as the support section;
   whereby during transient engine operation said thermal barrier coating causes a thermal response of said discourager seal section to closely correspond to a thermal response of said support section.

7. The nozzle support of claim 6 wherein during engine operation said support section has a surface exposed to cooling air and wherein said discourager seal radially outer surface is exposed to high temperature gases, and wherein said thermal barrier coating acts to slow the thermal flux to said substrate seal material keeping thermal gradients between said seal substrate and said support from causing expansion or contraction of said seal at a rate that would induce failure of said support.

* * * * *